United States Patent Office 3,632,850
Patented Jan. 4, 1972

3,632,850
CEPHALEXIN SYNTHESIS
William L. Garbrecht, Indianapolis, Ind., assignor to Eli Lilly and Company, Indianapolis, Ind.
No Drawing. Filed Mar. 18, 1969, Ser. No. 808,313
Int. Cl. C07d 99/24
U.S. Cl. 260—243 C      9 Claims

ABSTRACT OF THE DISCLOSURE

In the preparation of cephalexin from a penicillin sulfoxide ester by a series of steps involving expansion of the penicillin ring structure to the cephalosporin ring structure, an improvement in yield and ease of processing is realized when the p-nitrobenzyl ester is employed.

BACKGROUND OF THE INVENTION

In U.S. Pat. 3,275,626 there is disclosed a process whereby a penicillin sulfoxide is converted into a desacetoxy cephalosporin by heating the sulfoxide under acid conditions. The cephalosporin obtained in this manner contains a methylgroup in the 3-position while the substituent in the 7-position is that that was in the 6-position of the penicillin starting material. The amido group in the 7-position can be cleaved by any convenient means to obtain the 7-amino compound. Acylation of the 7-amino group with the proper acyl group results in the formation of antibiotically-active cephalosporins.

In order to protect the carboxyl group in the molecule during the course of the reactions involved it is preferred to use an ester of the penicillin. The ester group employed should be one that can be readily removed at the completion of the reactions since the cephalosporin free acids are more active than the cephalosporin esters.

Ester groups used heretofore have suffered from one or more disadvantages. For example, the group may be difficult to remove to regenerate the free carboxyl, the group may split off during the reaction leading to undesirable by-products, or the intermediate obtained in the course of the reaction may be viscous oils that are difficult to handle. Typical of such prior art esters are the methyl, benzyl, and 2,2,2-trichloroethyl esters.

SUMMARY

I have now discovered that the use of the p-nitrobenzyl ester in the synthesis of cephalexin by the ring expansion of a penicillin sulfoxide by heating under acidic conditions, followed by side chain cleavage, acylation with phenylglycine, and removal of the p-nitrobenzyl group results in increased yields and greater ease of handling and processability of the intermediate. The p-nitrobenzyl ester function confers on the several intermediate products a strong tendency to crystallize, thus enhancing isolation ease, product purity, and yields. In addition, this ester group is stable to acid so that no undersirable side products arise during the ring expansion or side chain cleavage steps due to partial de-esterification. Removal of the p-nitrobenzyl group is readily accomplished by reduction in acidic media, a clean, mild reaction free of degradation and $\Delta^2$ isomerization hazards.

DESCRIPTION OF THE PREFERRED EMBODIMENT

My process is an improvement on the process of preparing cephalexin from an ester of a pencillin sulfoxide having the formula

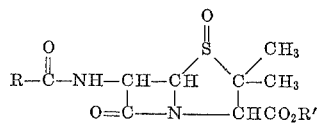

wherein R can be any organic radical so long as it is sufficiently stable to permit the desired ring expansion yet can be cleaved from the resulting cephalosporin to yield the 7-amino product and R' is the residue of an ester-forming group. From a practical standpoint I prefer to use a sulfoxide in which R is benzyl or phenoxymethyl since these are the side chains present in penicillin G and penicillin V. In accordance with my improvement, the ester-forming group represented by R' is the p-nitrobenzyl group.

The penicillin sulfoxide ester can be prepared by the oxidation of the penicillin free acid as described in U.S. 3,197,466 followed by esterification of the sulfoxide by treatment with a p-nitrobenzyl halide or the ester of the penicillin may first be prepared and the penicillin ester then oxidized to the sulfoxide. The manner in which the pencillin sulfoxide ester is obtained is unimportant to my process.

As the first step in the synthesis of cephalexin from this penicillin sulfoxide ester, the sulfoxide is heated under acid conditions at a temperature between about 75° and 175° C. This process is described in U.S. Pat. 3,275,626. This treatment results in expansion of the penicillin nucleus to yield a cephalosporin compound having the formula

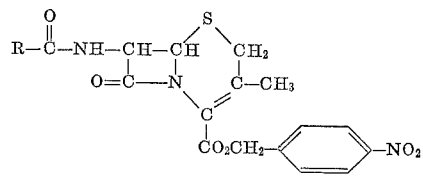

This type compound is known as a desacetoxy cephalosporin since it is substituted in the 3-position with a methyl group rather than an acetoxymethyl group as is found in cephalosporin C.

The desacetoxy cephalosporin from the first step of the process is then subjected to side chain cleavage to yield the 7-amino compound having the formula

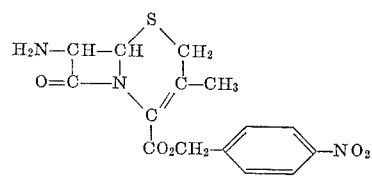

This is the p-nitrobenzyl ester of 7-aminodesacetoxycephalosporanic acid. This side chain cleavage step may be accomplished by any known procedure. Methods of side chain cleavage of cephalosporins are described in U.S. Pats. 3,188,311, 3,207,755 and 3,234,223 as well as British Pat. 1,119,806 and Dutch Pat. 6,513,095. The method by which the side chain is cleaved is not important to my improvement.

In the next step of the process the free amino group is acylated with phenylglycine. This acylation is accomplished using well-known acylation procedures wherein the phenylglycine is activated by a carbodiimide or is used in the form of an acid chloride or bromide or mixed anhydride such as the isobutyl or sec-butyl mixed anhydride. It is to be understood that the amino group of the phenylglycine is protected during the acylation reaction with a commonly-used amino protecting group such as trimethylsilyl, t-butoxycarbonyl, benzyloxycarbonyl, p-nitrobenzyloxycarbonyl, or the enamine formed with methyl acetoacetate.

All that remains to obtain cephalexin is the removal of the amine and carboxyl blocking groups. The procedure used to remove the amine blocking group will depend upon the group employed. Removal of amine blocking groups is a common procedure known to those skilled in the art. This may be accomplished by acid hydrolysis or hydrogenolysis depending upon the group present in the molecule.

The removal of the p-nitrobenzyl group is readily accomplished by reduction in an acidic medium. This same treatment will remove certain amine blocking groups such as the enamine groups and will therefore serve to remove both blocking groups. The reduction may be accomplished chemically, such as by the use of zinc and hydrochloric acid, or by catalytic hydrogenation using catalysts such as palladium, platinum, or the oxides thereof.

While I do not wish to be bound by any theory, it appears that a partial reduction of the p-nitrobenzyl group occurs, leading to an acid-labile intermediate. This intermediate readily cleaves in the presence of an acid to give the cephalosporin free acid.

All of the steps employed in this synthesis of cephalexin are well known in the prior art and no attempt is being made by me to claim any of the steps involved. My invention resides in the use of the p-nitrobenzyl group as a carboxyl protecting group during the various steps of the synthesis. Thus, my invention is an improvement in the process for the synthesis of cephalexin.

My improved process will be further illustrated by the following examples.

EXAMPLE 1

A solution of 37.0 g. of penicillin V 1-oxide, 15.0 ml. of trimethylamine, and 22.0 g. of p-nitrobenzyl bromide in 300 ml. of acetone is stirred for 4 hours at room temperature. A crystalline solid begins to precipitate during the first hour, and the mixture becomes quite thick during the reaction period. The mixture is treated with 600 ml. of water, stirred for one-half hour, and the solid collected and washed with water and ether. After drying, the colorless crystals weight 47 g., M.P. 186° to 196° C. The product is shown to be one component by thin layer chromatography, and its structure and purity are established by nuclear magnetic resonance spectroscopy.

p-Nitrobenzyl chloride reacts similarly to provide the desired ester if promoted by the addition of a small amount of potassium iodide. Dimethylformamide or dimethylacetamide provides a better solvent medium than acetone in this case. Esterification may be accomplished with p-nitrobenzyl alcohol via the phosgene procedure.

EXAMPLE 2

A solution of 10.0 g. of the p-nitrobenzyl ester of penicillin V 1-oxide obtained as described in Example 1, 1.0 g. of p-toluenesulfonic scid monohydrate, 10.0 ml. of acetic anhydride and 400 ml. of dimethylacetamide is warmed on a steam bath for 16 hours. The amber-colored solution is concentrated on the steam bath in vacuo and the residual syrup is triturated with 150 ml. of methanol causing almost immediate crystallization of the product. After chilling for several hours the tan crystals are collected, washed with methanol and dried. The crude product weighs 6.25 g., M.P. 172° to 180° C. Recrystallization from acetonitrile gives pure p-nitrobenzyl 3-methyl-7-phenoxyacetamido-$\Delta^3$-cephem-4-carboxylate as fine, colorless needles, M.P. 191° to 193° C. Purity and structure are determined by thin layer chromatography and nuclear magnetic resonance spectroscopy.

EXAMPLE 3

A mixture of 4.84 g. of the product from Example 2 and 3.80 g. of p-toluenesulfonic acid monohydrate in 100 ml. of methanol is heated under reflux for 5 hours. After cooling, unreacted starting material is recovered by filtration (1.15 g.). The mother liquor is concentrated to about 50 ml. under reduced pressure and then treated with ether to induce crystallization. After chilling, the waxy, somewhat unstable p-toluenesulfonic acid salt of p-nitrobenzyl 3-methyl-7-amino-$\Delta^3$-cephem-4-carboxylate is collected and dried. This product weighs 2.57 g. and has an M.P. of 100° to 105° C. The identity of the product is established by thin-layer chromatography and conversion to the free base, M.P. 174° to 176° C., and to the hydrochloride, M.P. (dec.) 197° to 200° C.

EXAMPLE 4

A suspension of 30.0 g. of sodium N-(2-methoxycarbonyl - 1 - methylvinylamino)-D-$\alpha$-phenylglycine in 500 ml. of dry acetonitrile is cooled to $-10°$ C. and treated with stirring with 1.0 ml. of N-methylmorpholine and then with 11.0 ml. of ethyl chloroformate. This mixture is stirred for 30 minutes and 38.7 g. of the hydrochloride from Example 3 is added followed by 14.0 ml. of triethylamine dropwise over a ten-minute period. The mixture is stirred for one and one-half hours at $-10°$ C., 1500 ml. of water is added rapidly dropwise, and stirring is continued for another one-half hour. The white solid which has precipitated is collected, washed with water and dried. The crude p-nitrobenzyl 3-methyl - 7 - [2-(2-methoxycarbonyl - 1 - methylvinylamino)-2-D-phenylacetamido] - $\Delta^3$ - cephem - 4 - carboxylate weighs 58.0 g., M.P. 158°–162° C. Recrystallization from warm methanol raises the M.P. to 188° to 190° C. The product is shown to be one component material by thin-layer chromatography and the structure is confirmed by nuclear magnetic resonance spectroscopy.

EXAMPLE 5

The procedure of Example 4 is repeated using 6.0 g. of the sodium salt of phenylglycine blocked with the t-butyloxycarbonyl group, 0.1 ml. of N-methylmorpholine, 100 ml. of acetonitrile, 2.20 ml. of ethyl chloroformate, 7.74 g. of the product for Example 3, and 2.8 ml of triethylamine. There is obtained 10.1 g. of crude product, M.P. 120° to 126° C. Recrystallization from acetonitrile raises the M.P. to 130° to 132° C.

EXAMPLE 6

The product from Example 4 is subjected to hydrogenation under acidic conditions to remove both the enamine blocking group and the p-nitrobenzyl group. A Parr hydrogenation vessel is charged with 5.8 g. of the product from Example 4, 2.0 g. of 5 percent palladium on alumina, 30 ml. of 1.0 N hydrochloric acid, and 70 ml. of methanol. The mixture is agitated on a shaker for one-half hour and then hydrogenated under 50 p.s.i. hydrogen pressure. After hydrogen uptake is complete the mixture is filtered and most of the methanol is removed under reduced pressure. The aqueous mixture is adjusted to pH 8 with concentrated ammonium hydroxide and extracted with several portions of ethyl acetate. The pH of the aqueous fraction is then adjusted to 4.5 with aqueous hydrochloric acid and crystallization is induced by the addition of 3 to 4 volumes of acetonitrile. The pure cephalexin is obtained as a slightly off-white crystalline solid which weighs 2.30 g. Purity and structure are confirmed by nuclear magnetic resonance spectroscopy.

EXAMPLE 7

The p-nitrobenzyl group is removed from the product from Example 5 by hydrogenation. The hydrogenation vessel is charged with 5.8 g. of the doubly-blocked cephalexin from Example 5, 2.0 g. of 5 percent palladium on alumina, 25 ml. of 3A ethanol, and 75 ml. of methanol. This mixture is hydrogenated on a Parr apparatus under 50 p.s.i. hydrogen pressure. After the hydrogen uptake is complete the mixture is filtered and the catalyst washed with methanol. The combined filtrate and washings are concentrated in vacuo. The yellow residual syrup is dissolved in 150 ml. of ethyl acetate and extracted with 100 ml. of saturated sodium bicarbonate solution. The aqueous extract is stirred with 150 ml. of ethyl acetate while the pH is adjusted to about 1.5 with concentrated hydrochloric acid. The ethyl acetate layer is separated and the aqueous layer extracted with another portion of ethyl acetate. The combined ethyl acetate extract is dried over magnesium sulfate and concentrated under reduced pressure to about 50 ml. volume. The solution is filtered, diluted with 200 ml. of isopropyl ether, and then treated to turbidity with benzene. After chilling for several hours the colorless solid is collected and dried. The t-butyloxycarbonyl blocked cephalexin weighs 2.60 g. The structure and purity are confirmed by nuclear magnetic resonance spectroscopy.

When the amino group of the phenylglycine is protected by the enamine blocking group, the blocking group is readily removed following the acylation step by treatment with p-toluenesulfonic acid monohydrate. The product obtained in the p-nitrobenzyl ester of cephalexin, p-toluenesulfonic acid salt. This is illustrated by the following example.

EXAMPLE 8

A stirred mixture of 30.0 g. of sodium N-(2-methoxycarbonyl - 1 - methylvinylamino) - D - α - phenylglycine and 500 ml. of acetonitrile is chilled to −15° C. and treated with 9.0 ml. of methyl chloroformate followed by 0.5 ml. of N-methylmorpholine. After 15 minutes, 38.7 g. of the hydrochloride from Example 3 is added followed by 14.0 ml. of triethylamine in 40 ml. of acetonitrile dropwise during 30 minutes. The reaction mixture is stirred for another 2 hours allowing the temperature to gradually increase to about 20° C. To the reaction mixture is added 25 g. of p-tolenensulfonic acid and stirring is continued for about 2 hours. The colorless crystalline precipitate of p-nitrobenzyl 3-methyl-7-phenylglycylamido - Δ³ - cephem - 4 - carboxylate p-toluenesulfonic acid salt is collected and dried. The yield was 62.0 g., M.P. 211°–216° C. (dec.). The product is sufficiently pure for conversion to cephalexin without further treatment.

EXAMPLE 9

A mixture of 6.54 g. of the product from Example 8, 50 ml. of acetonitrile, 10 ml. of water, and 200 mg. of platinum oxide is hydrogenated under 50 p.s.i. hydrogen. Workup of the reaction mixture as described in Example 6 yields 2.81 g. of cephalexin.

EXAMPLE 10

A mixture of 6.54 g. of the product from Example 8, 50 ml. of acetonitrile, 10 ml. of water, and 1.3 g. of zinc is stirred for 2 to 3 hours while maintaining pH 1 by periodic addition of concentrated hydrochloric acid. The reaction mixture is filtered and the pH adjusted to about 4.5 to precipitate 1.90 g. of cephalexin.

In a modification of my process, if the penicillin sulfoxide ester starting material contains the phenylglycyl side chain it is rearranged in the first step to the p-nitrobenzyl ester of cephalexin. It is understood that the amino group of the phenylglycyl side chain is protected during the rearrangement of the penicillin nucleus to the cephalosporin nucleus. Since this rearrangement involves acid conditions the preferred amino protecting group is the p-nitrobenzyloxycarbonyl group, which is acid stable. Both the p-nitrobenzyloxycarbonyl group and the p-nitrobenzyl ester group are removed by reduction and treatment with an acid to yield cephalexin. Therefore, it is possible to go from the penicillin to cephalexin without side chain cleavage and reacylation. This process is illustrated by the following example.

EXAMPLE 11

Ampicillin 1-oxide wherein the side-chain amino group is protected by the p-nitrobenzyloxycarbonyl group is converted to the p-nitrobenzyl ester by the procedure of Example 1. This ester is treated with p-toluenesulfonic acid monohydrate, acetic anhydride, and dimethylacetamide as described in Example 2 to yield the p-nitrobenzyl ester of cephalexin wherein the side-chain amino group is protected by the p-nitrobenzyloxycarbonyl group. This doubly-blocked cephalexin is hydrogenated under 50 p.s.i. hydrogen over a 5 percent palladium on alumina catalyst in the presence of hydrochloric acid following the procedure of Example 6. Workup of the reaction mixture as described in Example 6 yields cephalexin.

Many of the intermediates obtained in my improved process are novel compounds not known heretofore. These novel compounds are those having the structure:

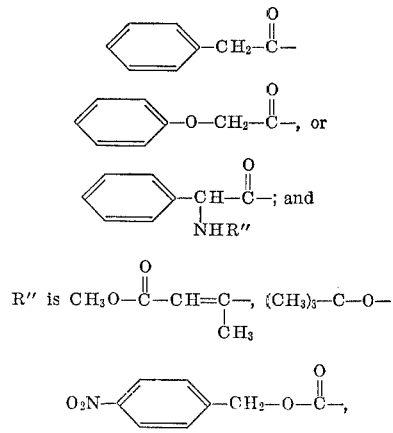

wherein R is hydrogen,

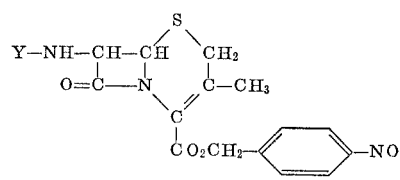

hydrogen, or hydrogen and p-toluenesulfonic acid.

All of the novel compounds of my invention are p-nitrobenzyl esters of cephalosporin compounds and are useful intermediates in the preparation of cephalexin from penicillins. The p-nitrobenzyl ester group confers unique properties on these compounds, including a tendency to crystallize, is stable under the conditions encountered in the process, but is easily removed by hydrogenation or chemical reduction under acid conditions.

These esters are those obtained from rearrangement of the esters of the sulfoxides of penicillin G, penicillin V, and ampicillin as well as the ester of 7-aminodesacetoxycephalosporanic acid. The side-chain amino group may be protected by the enamine obtained by reaction with methyl acetoacetate, the t-butyloxy-carbonyl group, or the p-nitrobenzyloxycarbonyl group. In addition, this amino group may be present as the p-toluenesulfonic acid salt or the free amine.

I claim:
1. In a method for the synthesis of cephalexin from a penicillin sulfoxide ester having the formula

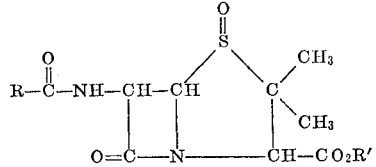

wherein R is benzyl or phenoxymethyl and R' is the residue of an ester-forming group by the steps of
(A) heating the penicillin sulfoxide ester under acidic conditions to effect conversion thereof to the corresponding desacetoxycephalosporin ester;
(B) cleaving the 7-phenylacetamido or 7-phenoxyacetamido group of the desacetoxycephalosporin ester to give the corresponding 7-aminodesacetoxycephalosporanic acid ester;
(C) acylating the 7-amino group of the 7-aminodesacetoxycephalosporanic acid ester with phenylglycine to give 7 - phenylglycylamidodesacetoxycephalosporanic acid ester;
(D) removing the ester group to yield cephalexin,
the improvement wherein the ester group represented by R' is p-nitrobenzyl.
2. A method as in claim 1 wherein R is benzyl.
3. A method as in claim 1 wherein R is phenoxymethyl.
4. In a method for the synthesis of cephalexin from a penicillin sulfoxide ester having the formula

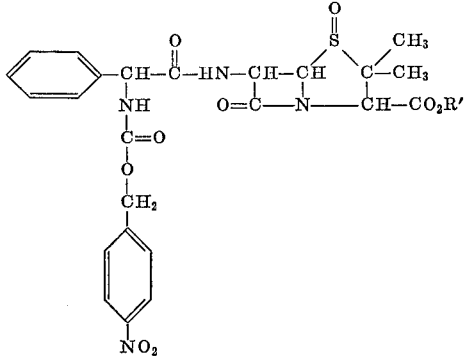

wherein R' is the residue of an ester-forming group by the steps of
(A) heating the penicillin sulfoxide ester under acidic conditions to effect conversion thereof to the corresponding desacetoxycephalosporin ester and
(B) removing the ester group and the p-nitrobenzyloxycarbonyl amino protecting group to yield cephalexin, the improvement wherein the ester group represented by R' is p-nitrobenzyl.

5. A compound having the formula

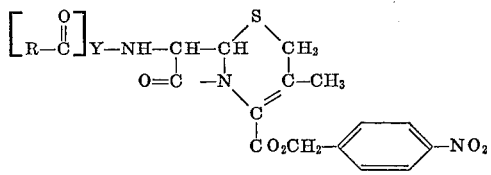

wherein Y is hydrogen,

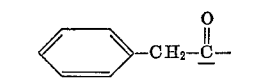

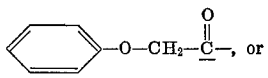

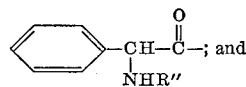

R'' is 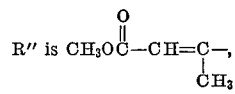

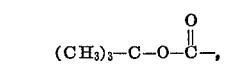

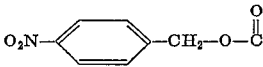

hydrogen, or hydrogen and p-toluenesulfonic acid.
6. A compound as in claim 5 wherein Y is hydrogen.
7. A compound as in claim 5 wherein Y is

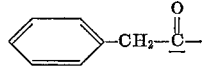

8. A compound as in claim 5 wherein Y is

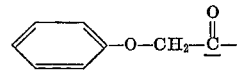

9. A compound as in claim 5 wherein Y is

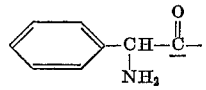

References Cited
UNITED STATES PATENTS
3,275,626  9/1966  Morin et al. _____ 260—243 C NICHOLAS S. RIZZO, Primary Examiner U.S. Cl. X.R.

260—239.1; 424—246

PO-1050
(5/69)

UNITED STATES PATENT OFFICE
CERTIFICATE OF CORRECTION

Patent No. 3,632,850          Dated January 4, 1972

Inventor(s) William L. Garbrecht

It is certified that error appears in the above-identified patent and that said Letters Patent are hereby corrected as shown below:

In column 6, line 40, "NO" should read --$NO_2$--.

In column 6, line 41, "wherein R is hydrogen," should read --wherein Y is hydrogen,--.

In column 6, line 54, "$(CH_3)_3-C-O-$" should read --$(CH_3)_3-C-O-\overset{\overset{O}{\|}}{C}$,--.

In claim 5, column 8, line 5, $\left[\overset{\overset{O}{\|}}{R-C}\right]$ should be deleted.

Signed and sealed this 27th day of June 1972.

EAL)
test:

WARD M. FLETCHER, JR.          ROBERT GOTTSCHALK
testing Officer          Commissioner of Patents